(12) United States Patent
Igarashi

(10) Patent No.: US 12,521,471 B2
(45) Date of Patent: Jan. 13, 2026

(54) BLOOD BAG SYSTEM AND MANUFACTURING METHOD THEREFOR

(71) Applicant: TERUMO KABUSHIKI KAISHA, Tokyo (JP)

(72) Inventor: Masatsugu Igarashi, Shizuoka (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 480 days.

(21) Appl. No.: 17/629,288

(22) PCT Filed: Jul. 17, 2020

(86) PCT No.: PCT/JP2020/027772
§ 371 (c)(1),
(2) Date: Jan. 21, 2022

(87) PCT Pub. No.: WO2021/015112
PCT Pub. Date: Jan. 28, 2021

(65) Prior Publication Data
US 2022/0249748 A1 Aug. 11, 2022

(30) Foreign Application Priority Data
Jul. 22, 2019 (JP) .................................. 2019-134526

(51) Int. Cl.
*A61M 1/02* (2006.01)
*B29C 43/36* (2006.01)
*B29D 22/00* (2006.01)

(52) U.S. Cl.
CPC ........ *A61M 1/0209* (2013.01); *A61M 1/0218* (2014.02); *A61M 1/0227* (2014.02); *B29C 43/36* (2013.01); *B29D 22/003* (2013.01)

(58) Field of Classification Search
CPC .............. A61M 1/0209; A61M 1/0218; A61M 1/0227; A61M 1/02; A61M 2207/00;
(Continued)

(56) References Cited

U.S. PATENT DOCUMENTS 3,187,750 A * 6/1965 Tenczar, Jr. ......... A61M 1/0209
604/410
5,490,848 A * 2/1996 Finley ................... A61J 1/2089
604/416
(Continued)

FOREIGN PATENT DOCUMENTS

EP 0615735 9/1994
JP S61-130231 8/1986
(Continued)

OTHER PUBLICATIONS

International Search Report prepared by the European Patent Office for International (PCT) Patent Application No. PCT/JP2020/027772, dated Oct. 16, 2020, 3 pages.
(Continued)

*Primary Examiner* — Andrew J Mensh
*Assistant Examiner* — Quynh Dao Le
(74) *Attorney, Agent, or Firm* — Sheridan Ross P.C.

(57) ABSTRACT

A blood bag system is equipped with a blood collection bag in which blood is accommodated, a parent bag and a child bag in which blood components separated from the blood are accommodated, and flow paths that connect the blood collection bag and the parent bag. The blood collection bag, the parent bag, the child bag, and the flow paths are formed integrally by a first sheet body and a second sheet body that is superimposed on the first sheet body, and meandering sections which are repeatedly folded back on themselves are provided in the flow paths.

20 Claims, 9 Drawing Sheets

(58) Field of Classification Search
CPC ........ A61J 1/05; A61J 1/10; A61J 1/12; A61J 1/2027; A61J 1/202; A61J 1/2079; A61J 1/2086; A61B 5/150366; B32B 2439/80; B29C 66/857; B29C 66/53261; B29C 66/53262; B29D 23/00; Y10S 128/24; B29L 2031/7148; Y10T 156/1052; A01N 1/14
USPC .................................. 604/403, 406, 409, 41
See application file for complete search history.

(56) References Cited

U.S. PATENT DOCUMENTS

| | | | | |
|---|---|---|---|---|
| 5,770,051 | A * | 6/1998 | Joie | B01D 21/26 |
| | | | | 210/85 |
| 5,836,933 | A | 11/1998 | Buttitta et al. | |
| 6,244,442 | B1 * | 6/2001 | Inoue | B65D 75/327 |
| | | | | 206/469 |
| 7,601,268 | B2 * | 10/2009 | Ragusa | A61M 1/3633 |
| | | | | 210/767 |
| 2003/0004453 | A1 * | 1/2003 | Goudaliez | A61M 1/0209 |
| | | | | 604/6.15 |
| 2005/0000640 | A1 * | 1/2005 | Dallapiazza | B29C 66/43 |
| | | | | 156/583.8 |
| 2005/0059540 | A1 * | 3/2005 | Skinkle | A61M 1/36226 |
| | | | | 494/48 |
| 2005/0261659 | A1 * | 11/2005 | Mizuo | B29C 65/02 |
| | | | | 604/410 |
| 2016/0242410 | A9 * | 8/2016 | Yoshida | A01N 1/0205 |
| 2020/0061365 | A1 * | 2/2020 | Alden | A61M 39/18 |
| 2021/0346589 | A1 * | 11/2021 | Robinson | A61M 1/92 |

FOREIGN PATENT DOCUMENTS

| | | |
|---|---|---|
| JP | H07-88148 | 4/1995 |
| JP | H11-511681 | 10/1999 |
| JP | 3587545 | 11/2004 |
| JP | 2006-141827 | 6/2006 |
| JP | 2015-159855 | 9/2015 |

OTHER PUBLICATIONS

Written Opinion prepared by the European Patent Office for International (PCT) Patent Application No. PCT/JP2020/027772, dated Oct. 16, 2020, 5 pages.

Office Action (English Translation) for Japan Patent Application No. 2022-502440, dated Jan. 22, 2024, 5 pages.

* cited by examiner

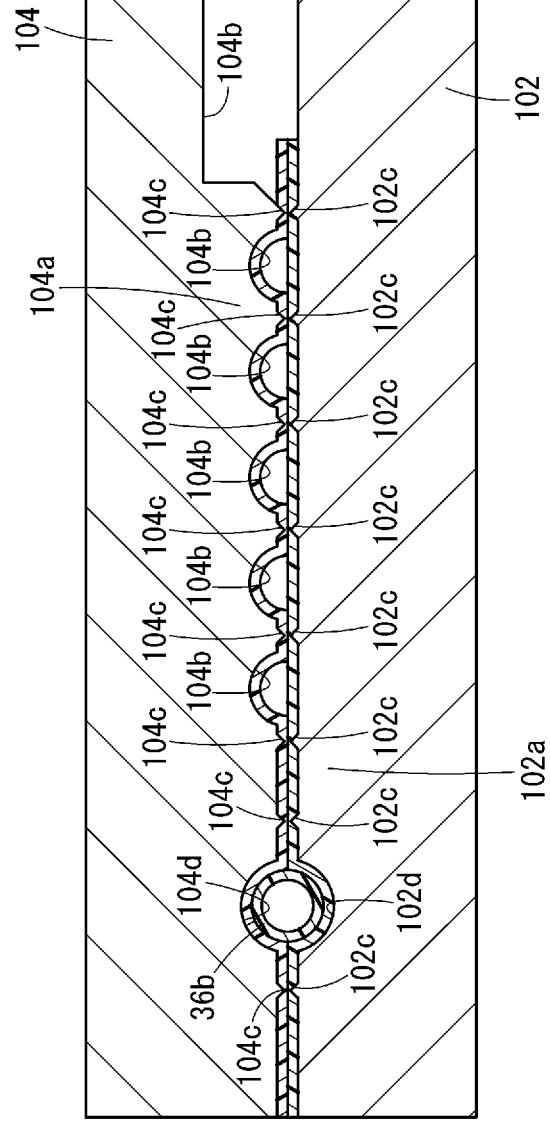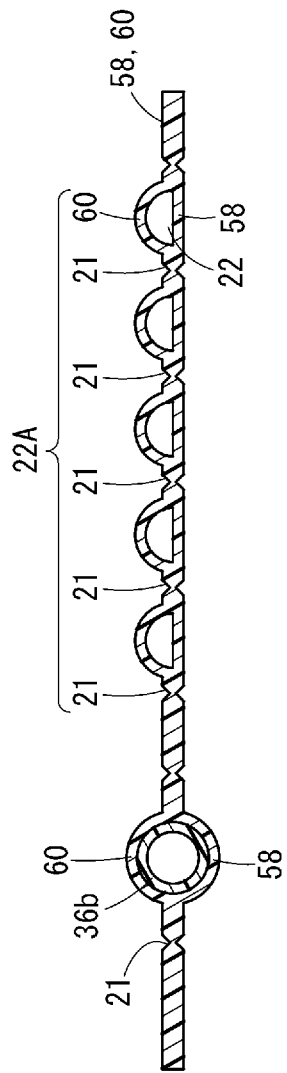
FIG. 6A
FIG. 6B

BLOOD BAG SYSTEM AND MANUFACTURING METHOD THEREFOR

CROSS REFERENCE TO RELATED APPLICATIONS

This application is a national stage application under 35 U.S.C. 371 and claims the benefit of PCT Application No. PCT/JP2020/027772 having an international filing date of 17 Jul. 2020, which designated the United States, which PCT application claimed the benefit of Japanese Patent Application No. 2019-134526 filed 22 Jul. 2019, the entire disclosures of each of which are hereby incorporated herein by reference, in their entireties, for all that they teach and for all purposes.

TECHNICAL FIELD

The present invention relates to a blood bag system equipped with a plurality of bags in which blood or blood components can be accommodated, as well as to a manufacturing method for such a blood bag system.

BACKGROUND ART

In blood transfusion, blood component transfusion is performed in which blood (whole blood) obtained by donated blood or the like are separated into blood components to provide only the components required by a patient. In this type of blood component transfusion, a blood bag system including a plurality of bags which are capable of accommodating blood or blood components is used (see Japanese Laid-Open Patent Publication No. 2015-159855).

The blood bag system includes a blood collection bag in which collected blood is accommodated, a leukocyte removal filter for removing white blood cells, a plurality of blood component bags in which various blood components are accommodated, a medicinal solution bag in which a storage solution to be added to the blood components is accommodated, and a plurality of tubes that connect these members. The blood bag system is used in a state in which the aforementioned various bags are connected by tubes.

The blood bag system is manufactured by preparing components such as the plurality of bags and a filter or the like according to specifications, and fusion bonding such components to the tubes and assembling them in a predetermined arrangement.

SUMMARY OF INVENTION

The specifications of blood bag systems differ from country to country, and since a large number of such specifications exist, standardization of manufacturing methods therefor has not been done, and in large part, it has been necessary for a large number of fusion bonding operations to be performed manually. Thus, in order to improve production efficiency, a method may be considered in which a blood collection bag, a blood component bag, a medicinal solution bag, a filter, and flow paths that connect these elements, which collectively form the blood bag system, are formed integrally from a pair of overlapping sheet bodies.

Incidentally, when the whole blood in the blood collection bag is transferred via the filter into the blood component bag, in order to ensure a difference in elevation between the blood collection bag and the blood component bag, there may be cases in which a flow path of a sufficient length is required. Further, an elongate flow path may be required depending on other requisite specifications. In order to form such an elongate flow path, a problem arises in that large sheet bodies are required, and the device configuration and molds required for processing of the flow paths must be made large in scale.

Thus, an embodiment of the present invention has the object of providing a blood bag system and a manufacturing method therefor, which enable a sufficiently long flow path to be formed in an integrated manner with blood collection bags, without causing an increase in the size of the sheet bodies.

One aspect of the disclosure to be described below is characterized by a blood bag system equipped with a plurality of bags in which blood is accommodated, and flow paths connecting the plurality of bags, the blood bag system including a main body portion integrally formed by a first sheet body, and a second sheet body that is superimposed on the first sheet body, wherein the main body portion includes a first bag in which the blood is accommodated, a second bag in which a blood component contained in the blood is accommodated, a first flow path connecting the first bag and the second bag, and a meandering section in which portions of the first flow path are repeatedly folded back on themselves, and adjacent portions of the first flow path are fusion bonded to each other, wherein the fusion bonded portions of the first flow path of the meandering section are connected via thin-walled cuttable portions configured to be separatable.

Another aspect is characterized by a method of manufacturing a blood bag system equipped with a first bag in which blood is accommodated, a second bag in which a blood component separated from the blood is accommodated, and a first flow path connecting the first bag and the second bag, wherein the first bag, the second bag, and the first flow path are integrally formed by a first sheet body, and a second sheet body that is superimposed on the first sheet body, and the first flow path includes a meandering section that is repeatedly folded back on itself, the method of manufacturing the blood bag system including a step of preparing a first sheet body in which a first bag formation planned portion, a second bag formation planned portion, and a preprocessing unit formation planned portion are integrally connected, and a second sheet body in which a first bag formation planned portion, a second bag formation planned portion, and a preprocessing unit formation planned portion are integrally connected, a superimposing step of superimposing the second sheet body on the first sheet body, and a fusion bonding step of fusion bonding the first sheet body and the second sheet body at peripheral edge portions of the first bag formation planned portions, the second bag formation planned portions, and the preprocessing unit formation planned portions while blowing air between the first sheet body and the second sheet body, to thereby form the first bag, the second bag, and the first flow path respectively in the first bag formation planned portions, the second bag formation planned portions, and the preprocessing unit formation planned portions, wherein, in the fusion bonding step, the meandering section of the first flow path that is repeatedly folded back on itself is formed in the preprocessing unit formation planned portions.

According to the blood bag system and the method of manufacturing the same having the above-described aspects, elongate flow paths can be formed compactly by providing the meandering sections.

BRIEF DESCRIPTION OF DRAWINGS

FIG. 6A is a cross-sectional view of a method of fusion bonding the first sheet body and the second sheet body shown in FIG. 5, and showing as an example a portion taken along line VIA-VIA, and FIG. 6B is a cross-sectional view of a structure formed by the fusion bonding method of FIG. 6A;

DESCRIPTION OF EMBODIMENTS

Hereinafter, preferred embodiments of a blood bag system and a manufacturing method therefor will be presented and described in detail below with reference to the accompanying drawings.

First Embodiment

Figure 1:
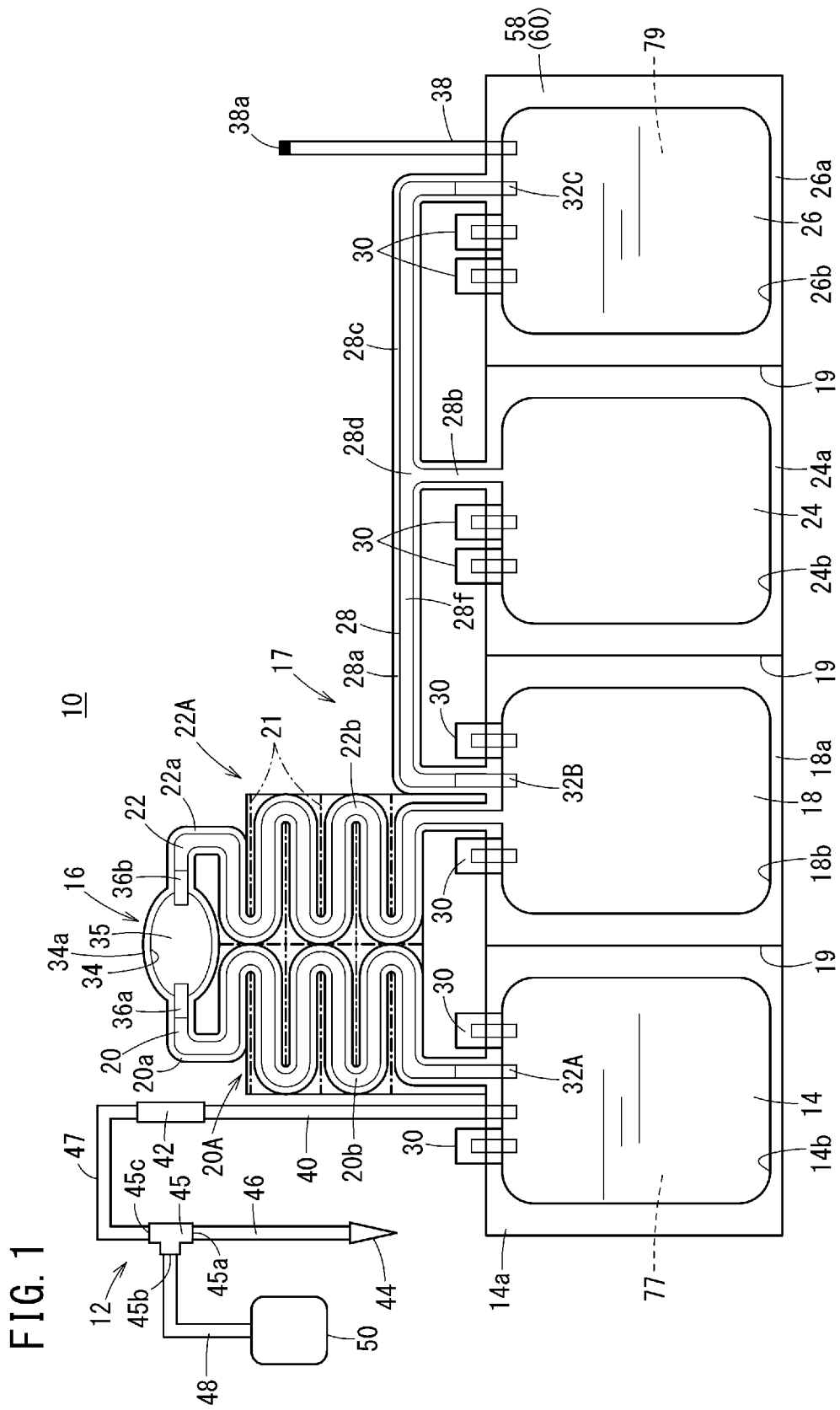
FIG. 1 is an overall schematic diagram of a blood bag system according to an embodiment of the present invention.

As shown in FIG. 1, a blood bag system 10 according to the present embodiment serves as a system for centrifugally separating blood containing a plurality of components into a plurality of components having different specific gravities (for example, two components of a light specific gravity component and a heavy specific gravity component), and accommodating and storing the respective components in different bags. The blood bag system 10 according to the present embodiment is configured so as to centrifugally separate the remaining blood components, in which white blood cells and blood platelets have been removed from whole blood, into two components of blood plasma and concentrated red blood cells, and to accommodate and store the plasma and the concentrated red blood cells into different bags.

The blood bag system 10 includes a blood collection unit 12 that collects blood from a donor, a blood collection bag 14 (first bag) in which collected whole blood is accommodated, a preprocessing unit 16 that removes predetermined blood components from the whole blood, and a separation processing unit 17 which centrifugally separates the remaining blood components obtained by removing the predetermined components, into a plurality of blood components, together with accommodating the respective components in different bags (second bags). The above parts that constitute the blood bag system 10 are formed together integrally in a main body portion including a first sheet body 58, and a second sheet body 60 that is superimposed on the first sheet body 58.

The blood collection unit 12 includes blood collection tubes 40, 46, and 47, a branching tube 48, a breakable member 42, a blood collection needle 44, a branch connector 45, and an initial flow blood bag 50.

The branch connector 45 is equipped with a first port 45a, a second port 45b, and a third port 45c. The blood collection tube 46 is connected to the first port 45a, the branching tube 48 is connected to the second port 45b, and the blood collection tube 47 is connected to the third port 45c. One end of the blood collection tube 46 is connected to the first port 45a of the branch connector 45, and the blood collection needle 44 is connected to the other end. The blood collection needle 44 has a needle tip that is punctured into the skin of the donor when blood collection from the donor is carried out, and is a part into which blood from the donor flows.

The second port 45b of the branch connector 45 is connected to one end of the branching tube 48, and the initial flow blood bag 50 is connected to the other end thereof. The initial flow of blood when blood is collected flows into the branching tube 48 through the second port 45b of the branch connector 45, and is accommodated in the initial flow blood bag 50. The initial flow blood bag 50 accommodates a predetermined amount of the initial flow of blood.

One end of the blood collection tube 47 is connected to the third port 45c of the branch connector 45, and the other end is connected to one end of the breakable member 42. The breakable member 42 is configured in a manner so that the flow path is closed in an initial state; however, the flow path is opened by performing a breaking operation. The blood collection bag 14 is connected via the blood collection tube 40 to the other end of the breakable member 42. The breakable member 42 is subjected to a breaking operation after the initial flow of blood is collected in the initial flow blood bag 50, and thereby enables communication between the blood collection tube 47 and the blood collection bag 14. The whole blood collected from the donor flows into the blood collection bag 14 through the opened breakable member 42. The blood collection tube 40 is made from a thermoplastic resin or the like, and is configured to be fusion bonded and sealed by a tube sealer or the like and be cut, after the completion of blood collection.

The blood collection bag 14 (first bag) is formed in a bag shape by superimposing the first sheet body 58 and the second sheet body 60, which are made of resin sheets, and fusion bonding (heat fusion bonding or high (radio) frequency fusion bonding) peripheral edge portions thereof. The first sheet body 58 and the second sheet body 60 are made of a material possessing flexibility and manufactured from a soft resin such as polyvinyl chloride or polyolefin. Further, it is preferable that the first sheet body 58 and the second sheet body 60 use transparent or translucent resin sheets, in order to facilitate optical discrimination between the blood plasma and the concentrated red blood cells when the blood components are transferred through a later-described transfer line 28. The blood collection bag 14 preferably contains an anticoagulant 77 in order to prevent coagulation of the blood (whole blood). The anticoagulant 77 is normally a liquid, examples of which include an ACD-A solution, a CPD solution, a CPDA-1 solution, and a heparin sodium solution. The amount of the anticoagulant 77 is an appropriate amount in accordance with the expected amount of blood to be collected.

One end of the blood collection tube 40 is connected to the blood collection bag 14. Further, a plurality of connection ports 30 and a breakable member 32A are provided in the blood collection bag 14. The blood collection tube 40, the connection ports 30, and the breakable member 32A penetrate through a sealed portion 14a on one end side of the blood collection bag 14 in a direction of joined surfaces of the first sheet body 58 and the second sheet body 60, and communicate with the interior of the blood collection bag 14.

The connection ports 30 are covered and sealed by covers, and are configured in a manner so that, by removing the covers, the ports are exposed to enable connection with tubes or the like. The breakable member 32A has one end connected to the interior 14b of the blood collection bag 14, and another end connected to an inlet-side flow path 20 (first flow path) to be described later. The breakable members 32A to 32C are configured in a manner so that the flow paths are closed in an initial state; however, the flow paths are opened by performing a breaking operation. The breakable member 32A is configured in the same manner as the breakable member 42, so that when a breaking operation is performed, the interior 14b of the blood collection bag 14 communicates with the inlet-side flow path 20.

The preprocessing unit 16 includes a filter 35 for removing predetermined components (cells), an inlet-side flow path 20, and an outlet-side flow path 22. The inlet-side flow path 20 and the outlet-side flow path 22 constitute a first flow path connecting the blood collection bag 14 and a parent bag 18. The inlet-side flow path 20 is a flow path for transferring blood collected from the donor from the blood collection bag 14 to the filter 35. One end of the inlet-side flow path 20 is connected to the breakable member 32A, and another end is in communication with an inlet port 36a of the filter 35. The inlet-side flow path 20 comprises a sealed portion 20a in which the first sheet body 58 and the second sheet body 60 are overlapped, and both side parts, which are peripheral edge portions thereof, are fusion bonded. An interior 20b thereof through which the blood flows is formed inside the portion that is sealed by the sealed portion 20a. According to the present embodiment, in the flow path 20, a meandering section 20A is formed so as to be folded back on itself a plurality of times in a widthwise direction of the blood collection bag 14. The elongate flow path 20 is formed in a compactly folded state by the meandering section 20A. In the meandering section 20A, as indicated by the one-dot dashed lines, cuttable portions 21 are formed between adjacent portions of the flow path 20. The cuttable portions 21 are portions where the sealed portion 20a of the first sheet body 58 and the second sheet body 60 are formed to be thin-walled in the shape of grooves. The cuttable portions 21 are configured so as to be capable of being easily cut by pulling on the flow path 20.

The outlet-side flow path 22 is a flow path for transferring the blood that has passed through the filter 35, to the parent bag 18. One end of the outlet-side flow path 22 is connected to an outlet port 36b of the filter 35, and another end is connected to the parent bag 18. In the same manner as the inlet-side flow path 20, the outlet-side flow path 22 comprises a sealed portion 22a in which the first sheet body 58 and the second sheet body 60 are overlapped, and both side parts, which are peripheral edge portions thereof, are fusion bonded. An interior 22b thereof through which the blood flows is formed inside the portion that is sealed by the sealed portion 22a. In the flow path 22, a meandering section 22A is formed so as to be folded back on itself a plurality of times in a widthwise direction of the blood collection bag 14 and the parent bag 18. The elongate flow path 22 is formed in a compactly folded state by the meandering section 22A. In the meandering section 22A, as indicated by the one-dot dashed lines, the cuttable portions 21 are formed between adjacent portions of the flow path 22, and the cuttable portions 21 are configured so as to be capable of being easily separated.

The filter 35 removes predetermined cells when the blood is transferred from the blood collection bag 14 to the parent bag 18. According to the present embodiment, the filter 35 is a leukocyte removing filter. In such a leukocyte removing filter, a filter medium made of a liquid-permeable porous body or a non-woven fabric can be used. In the present embodiment, the filter 35 may be configured in a manner so as to enable capturing of blood platelets. An inlet port 36a and an outlet port 36b are provided in the filter 35. The inlet port 36a and the outlet port 36b are made from tubular shaped resin members, and constitute an inlet and an outlet for the blood to and from the filter 35.

The inlet-side flow path 20, the outlet-side flow path 22, and the filter 35 are formed by the first sheet body 58 and the second sheet body 60, and are integrally connected to the blood collection bag 14 and the parent bag 18. Both sides of the inlet-side flow path 20 and the outlet-side flow path 22 are sealed by the sealed portions 20a and 22a of the first sheet body 58 and the second sheet body 60. Further, the filter 35 is formed in a filter accommodating unit 34 of the first sheet body 58 and the second sheet body 60. Peripheral edge portions of the filter accommodating unit 34 are sealed in a bag shape by a sealed portion 34a between the first sheet body 58 and the second sheet body 60. The sealed portions 20a and 22a of the inlet-side flow path 20 and the outlet-side flow path 22, the sealed portion 34a of the filter accommodating unit 34, and the sealed portion 14a of the blood collection bag 14 are connected in a non-separable manner.

The separation processing unit 17 includes the parent bag 18 in which residual blood from which predetermined cells have been removed by the filter 35 is accommodated, a child bag 24 in which a supernatant component obtained by centrifugally separating the blood inside the parent bag 18 is accommodated, a medicinal solution bag 26 in which a red blood cell storage solution 79 (medicinal solution) is accommodated, and the transfer line 28 connected to the parent bag 18, the child bag 24, and the medicinal solution bag 26. According to the present embodiment, concerning the second bags in which the blood components are accommodated, two of such bags, namely, the parent bag 18 and the child bag 24, are provided. Further, the medicinal solution bag 26 constitutes a third bag in which the medicinal solution is accommodated. Furthermore, the transfer line 28 makes up a second flow path.

The parent bag 18, the child bag 24, and the medicinal solution bag 26, in the same manner as the blood collection bag 14, are configured in bag shapes by superimposing the first sheet body 58 and the second sheet body 60, and fusion bonding sealed portions 18a, 24a, and 26a at peripheral edge portions thereof. Moreover, on the first sheet body 58 and the second sheet body 60, a boundary between the blood collection bag 14 and the parent bag 18, a boundary between the parent bag 18 and the child bag 24, and a boundary between the child bag 24 and the medicinal solution bag 26 are separated from each other at respective cutting portions 19. Instead of the cutting portions 19, groove-shaped cuttable portions 21 which can be easily cut may also be provided (see FIG. 6B). In this case, the blood collection bag 14, the parent bag 18, the child bag 24, and the medicinal solution bag 26 are provided in a state of being integrally connected via the cuttable portions 21. The cuttable portions 21 can be easily cut by a user, whereby the blood collection bag 14, the parent bag 18, the child bag 24, and the medicinal solution bag 26 can be separated immediately prior to being used.

The parent bag 18 serves both as a bag for accommodating the residual blood from which predetermined cells have been removed by the filter 35, and a bag for storing a sedimentation component (concentrated red blood cells) obtained by centrifugally separating blood. The outlet-side flow path 22 is connected to an upper end part of the parent bag 18, and blood flows into the interior 18b of the parent bag 18 via the outlet-side flow path 22. Further, the parent bag 18 is equipped with connection ports 30 and a breakable member 32B at an upper portion thereof. The connection ports 30 comprise tubular members that penetrate through the sealed portion 18a, together with covers that cover the tubular members so as to be capable of being opened and closed. The breakable member 32B, in the same manner as the breakable member 42, comprises a flow path configured to be capable of being opened by performing a breaking operation. The breakable member 32B penetrates through the sealed portion 18a, and is connected to one end of the transfer line 28.

The child bag 24 serves as a bag for storing a supernatant component (blood plasma) obtained by subjecting the parent bag 18 to centrifugation. Connection ports 30 and the transfer line 28 are connected to an upper end part of the child bag 24. The child bag 24 is connected to the parent bag 18 via the transfer line 28.

The medicinal solution bag 26 accommodates the red blood cell storage solution 79 that is supplied to the parent bag 18. As the red blood cell storage solution 79, there may be used a MAP solution, a SAGM solution, an OPTISOL solution, or the like. Connection ports 30, a breakable member 32C, and a tube 38 are connected to an upper end of the medicinal solution bag 26. The transfer line 28 is connected to one end of the breakable member 32C. The breakable member 32C comprises a flow path that is opened by performing a breaking operation. The breakable member 32C places the transfer line 28 in communication with an interior 26b of the medicinal solution bag 26 by performing a breaking operation. The tube 38 is a tube for injecting the medicinal solution into the medicinal solution bag 26, and a sealing member 38a thereof is sealed by being subjected to fusion bonding with a sealer or the like.

The transfer line 28 constitutes a flow path that connects the parent bag 18 and the child bag 24, and also connects the parent bag 18 and the medicinal solution bag 26. The illustrated transfer line 28 comprises a flow path 28a connected to the parent bag 18, a flow path 28b connected to the child bag 24, a flow path 28c connected to the medicinal solution bag 26, and a branching part 28d of the flow path 28a, the flow path 28b, and the flow path 28c. The transfer line 28 is equipped with a sealed portion 28e where the first sheet body 58 and the second sheet body 60 are overlapped and fusion bonded on peripheral edges (both side parts) thereof. The transfer line 28 includes an interior portion 28f that allows liquid to flow through a portion surrounded by the sealed portion 28e. The first sheet body 58 and the second sheet body 60 that constitute the transfer line 28 are integrally connected to the portions constituting the parent bag 18, the child bag 24, and the medicinal solution bag 26.

Hereinafter, a description will be given concerning a method of manufacturing the blood bag system 10 of the present embodiment.

In the blood bag system 10 according to the present embodiment, in order to reduce the number of fusion bonding steps (the number of joined parts due to fusion bonding), the blood collection bag 14, the preprocessing unit 16, and the separation processing unit 17 are integrally formed using the first sheet body 58 and the second sheet body 60. Therefore, in the manufacturing method according to the present embodiment, the blood collection bag 14, the parent bag 18, the child bag 24, and the medicinal solution bag 26, as well as the inlet-side flow path 20, the outlet-side flow path 22, the transfer line 28, and the filter accommodating unit 34 are formed at the same time.

Figure 2:
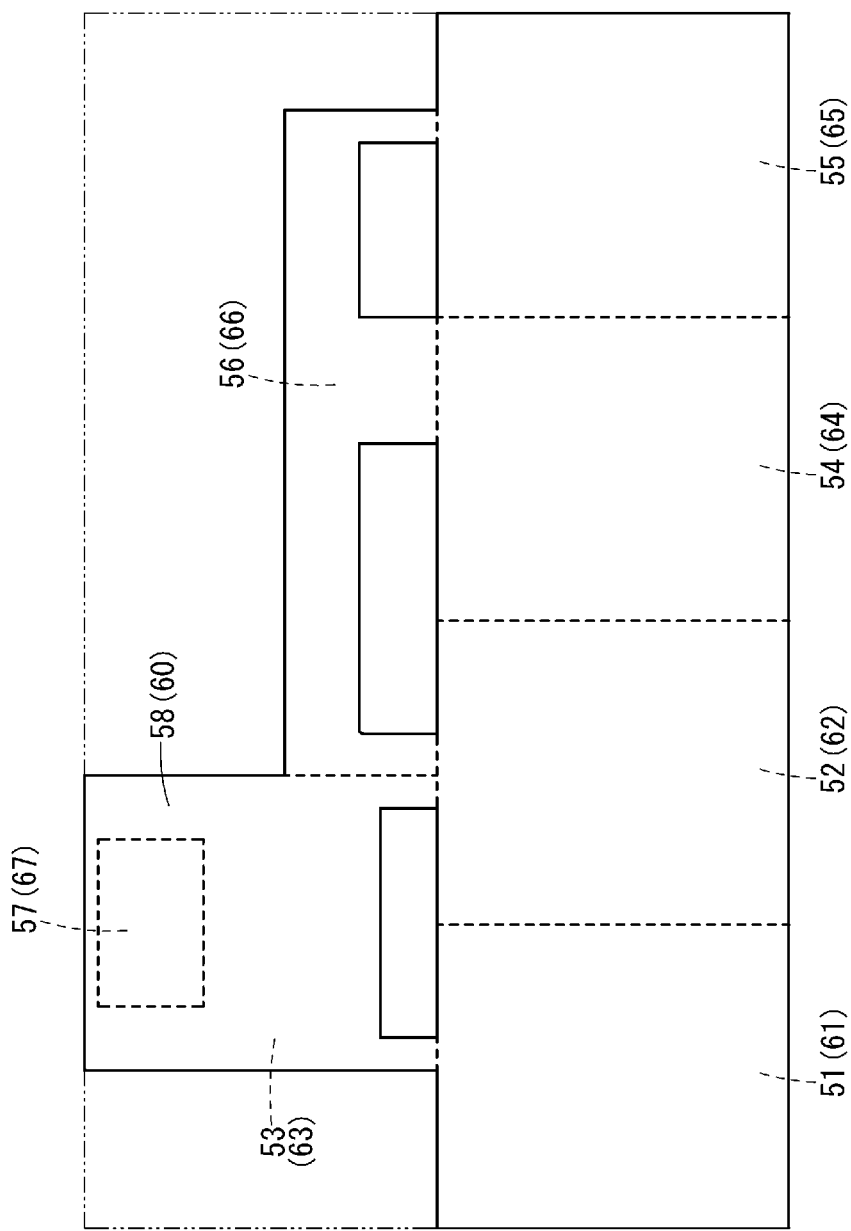
FIG. 2 is a plan view of a first sheet body used in manufacturing the blood bag system shown in FIG. 1.

First, as shown in FIG. 2, the first sheet body 58 and the second sheet body 60, which are rectangular shaped and are represented by the two-dot dashed lines and solid lines, are prepared. As shown in the drawing, the first sheet body 58 includes a first bag formation planned portion 51 where the blood collection bag 14 is formed, a second bag formation planned portion 52 where the parent bag 18 is formed, a preprocessing unit formation planned portion 53 where the preprocessing unit 16 is formed, a child bag formation planned portion 54 where the child bag 24 is formed, a third bag formation planned portion 55 where the medicinal solution bag 26 is formed, and a transfer line formation planned portion 56 where the transfer line 28 is formed. Among these portions, the preprocessing unit formation planned portion 53 includes a filter formation planned portion 57 in which the filter 35 is arranged. The second sheet body 60 is shaped into the same shape as the first sheet body 58.

The first bag formation planned portion 51 is set to dimensions that include the sealed portion 14a (see FIG. 1) on the peripheral edge of the blood collection bag 14. Similarly, the second bag formation planned portion 52, the child bag formation planned portion 54, and the third bag formation planned portion 55 are set to dimensions that include the sealed portions. The preprocessing unit formation planned portion 53 and the transfer line formation planned portion 56 are set to dimensions having a wider range than the sealed portions of the flow paths 20 and 22 and the transfer line 28.

Next, a shaping step of cutting the first sheet body 58 and shaping the first sheet body 58 into a shape surrounded by the contour shown by the solid line in the drawing is performed. In accordance with this step, the first sheet body 58 is formed into a shape of being constituted by the first bag formation planned portion 51, the second bag formation planned portion 52, the preprocessing unit formation planned portion 53, the child bag formation planned portion 54, the third bag formation planned portion 55, and the transfer line formation planned portion 56. The filter formation planned portion 57 is provided in the preprocessing unit formation planned portion 53. Concerning the second sheet body 60 as well, it is formed in the same shape as the first sheet body 58. More specifically, the second sheet body 60 is formed into a shape of being constituted by a first bag formation planned portion 61, a second bag formation planned portion 62, a preprocessing unit formation planned portion 63, a child bag formation planned portion 64, a third bag formation planned portion 65, and a transfer line formation planned portion 66. A filter arrangement planned portion 67 is provided in the preprocessing unit formation planned portion 63. Shaping of the first sheet body 58 (and the second sheet body 60) can be carried out by a method in which the first sheet body 58 (or the second sheet body 60) is arranged on a flat lower mold, and then pressing a mold (upper mold) on which a cutting blade is formed at predetermined portions, from above. Further, shaping of the first sheet body 58 (and the second sheet body 60) may be performed by various cutting methods starting with laser cutting or the like.

Figure 3:
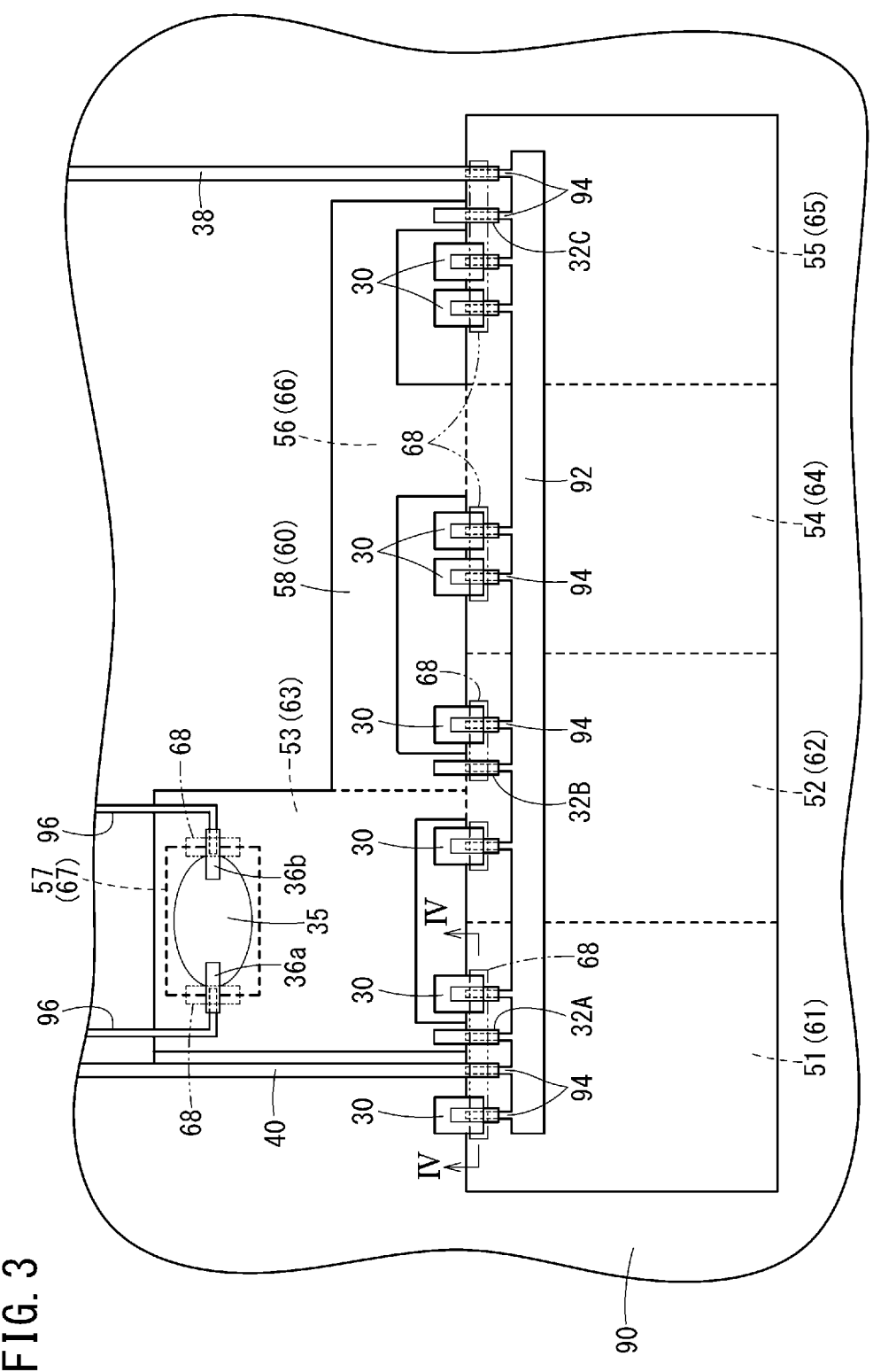
FIG. 3 is a plan view showing a state in which components are arranged on the first sheet body shown in FIG. 2.

Next, as shown in FIG. 3, a component arrangement step is performed of arranging the components required by the blood bag system 10 between the first sheet body 58 and the second sheet body 60. In this instance, the connection ports 30 to be attached to the respective bags, the breakable members 32A to 32C, the tubes 38 and 40, and the filter 35 that is mounted in the preprocessing unit 16 are arranged on the first sheet body 58. The arrangement of the connection ports 30, the breakable members 32A to 32C, and the tubes 38 and 40 is carried out using an arrangement jig 92. The arrangement jig 92 is made of a conductive material such as metal or the like, and comprises a plurality of mounting pins 94 that project in one direction. The mounting pins 94 are disposed at positions where the connection ports 30, the breakable members 32A to 32C, and the tubes 38 and 40 are arranged. The mounting pins 94 are formed with a thickness to enable the mounting pins 94 to be inserted into the connection ports 30, the breakable members 32A to 32C, and the tubes 38 and 40. The connection ports 30, the breakable members 32A to 32C, and the tubes 38 and 40 are arranged on the first sheet body 58 in a state of being mounted on the mounting pins 94. The connection ports 30, the breakable members 32A to 32C, and the tubes 38 and 40 are arranged on the first sheet body 58 through sealing members 68 (see FIG. 4) made of a thermoplastic resin or the like.

Further, the filter 35 is arranged on the first sheet body 58 in a state with filter arrangement jigs 96 being inserted into the inlet port 36a and the outlet port 36b that are joined to both ends of the filter. Similar to the arrangement jig 92, a conductive material such as metal or the like can be used for the filter arrangement jigs 96.

Next, the second sheet body 60 is overlaid on the first sheet body 58 on which the connection ports 30, the breakable members 32A to 32C, and the tubes 38 and 40 are arranged. The second sheet body 60 is shaped into the same shape as the first sheet body 58, and is equipped with the first bag formation planned portion 61, the second bag formation planned portion 62, the preprocessing unit formation planned portion 63, the child bag formation planned portion 64, the third bag formation planned portion 65, and the transfer line formation planned portion 66. Components such as the connection ports 30, the breakable members 32A to 32C, and the tubes 38 and 40 are placed in abutment with the second sheet body 60 through the sealing members 68. In the manner described above, arrangement of the components constituting the blood bag system 10 between the first sheet body 58 and the second sheet body 60 is completed.

Thereafter, a temporary fixing step is performed to fix the connection ports 30, the breakable members 32A to 32C, the tubes 38 and 40, and the filter 35, which are disposed between the first sheet body 58 and the second sheet body 60, to the first sheet body 58 and the second sheet body 60. In this instance, as shown in the figures, these components are fixed between the first sheet body 58 and the second sheet body 60 using the sealing members 68 which are made of a thermoplastic resin. The sealing members 68 are disposed in a manner so as to cover the connection ports 30, the breakable members 32A to 32C, the tubes 38 and 40, and the ports 36a and 36b of the filter 35. The arrangement positions of the sealing members 68 are arranged so as to overlap with the filter arrangement jigs 96 or the mounting pins 94 of the arrangement jig 92.

Figure 4:
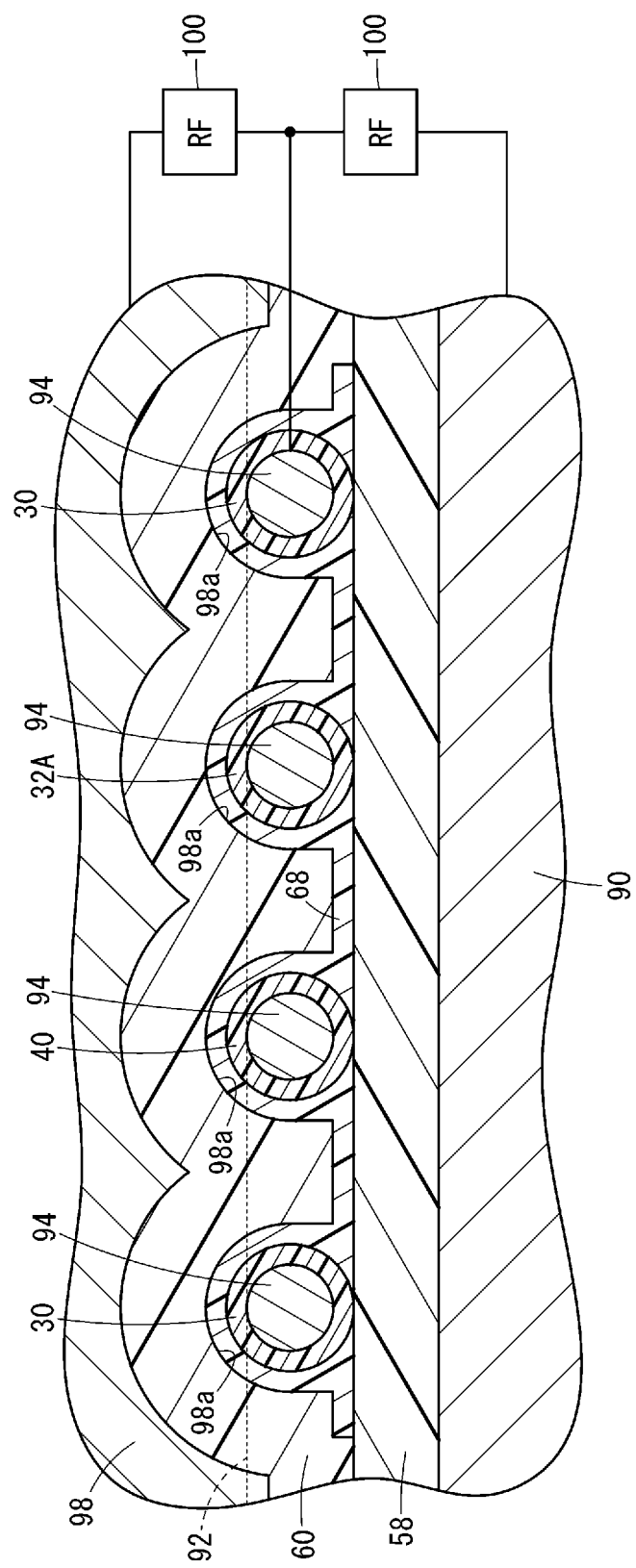
FIG. 4 is a cross-sectional view showing a method of joining the components shown in FIG. 3 to the first sheet body, and showing as an example a portion taken along line IV-IV.

Next, as shown in FIG. 4, the components that are covered by the sealing members 68 are pressed by an upper mold 98. Concave portions 98a having shapes corresponding to the outer peripheral shapes of the components at portions corresponding to the components are provided in the upper mold 98, and the ports 30, 36a, and 36b, the breakable members 32A (32B to 32C), and the tubes 38 and 40 can be pressed into close contact between the first sheet body 58 and the second sheet body 60 via the sealing members 68.

Furthermore, a high (radio) frequency power supply 100 is connected between the arrangement jig 92 (including the filter arrangement jigs 96) and the upper mold 98, as well as between the arrangement jig 92 (including the filter arrangement jigs 96) and a lower mold 90. The high frequency power supply 100 applies a high frequency electric field between the mounting pins 94 and the upper mold 98, and between the mounting pins 94 and the lower mold 90, as well as to the first sheet body 58, the sealing members 68, and the second sheet body 60 provided between the upper mold 98 and the lower mold 90. The high frequency electric field heats the first sheet body 58, the sealing members 68, and the second sheet body 60 to thereby fusion bond them. As a result, components such as the ports 30, 36a, and 36b, the breakable members 32A to 32C, and the tubes 38 and 40 are fixed at predetermined positions between the first sheet body 58 and the second sheet body 60.

Figure 5:
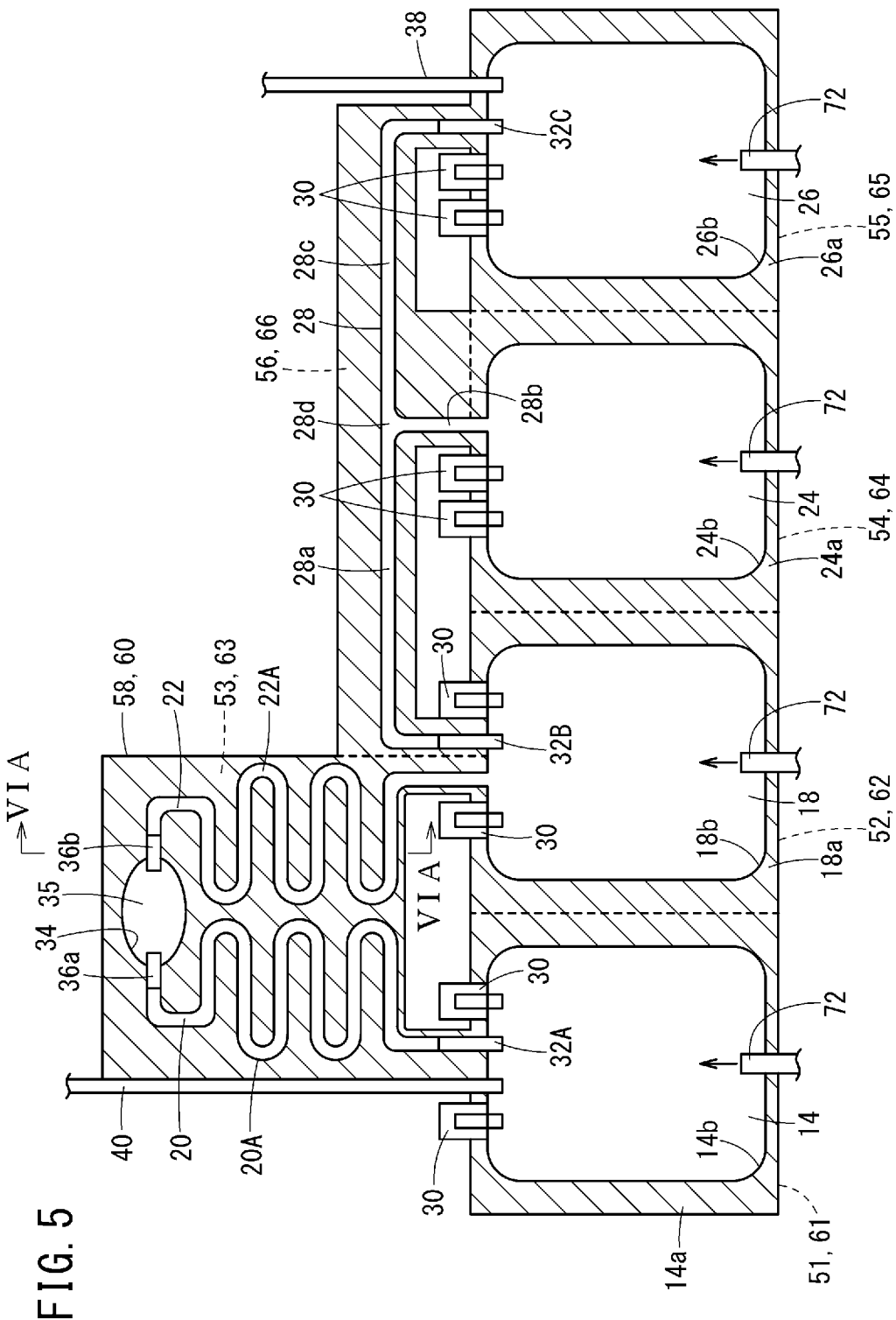
FIG. 5 is a plan view showing fusion bonded portions of the first sheet body and a second sheet body.

Next, a fusion bonding step of fusion bonding the first sheet body 58 and the second sheet body 60 is performed. According to the present embodiment, as shown in FIG. 5, portions (shaded areas) indicated by the oblique lines, which are peripheral edge portions of the first bag formation planned portion 61, the second bag formation planned portion 62, the preprocessing unit formation planned portion 63, the child bag formation planned portion 64, the third bag formation planned portion 65, and the transfer line formation planned portion 66, are subjected to fusion bonding while being sandwiched and pressed between a lower mold 102 and an upper mold 104 (see FIG. 6A).

In the fusion bonding step according to the present embodiment, as shown in FIG. 6A, in the upper mold 104, cavities 104b are provided at portions constituting the flow paths 20 and 22. The cavities 104b of the upper mold 104 have the shapes of the blank portions that are surrounded by hatching as shown in FIG. 5. Further, in the upper mold 104, the cavities 104b are also provided at portions constituting the interiors 14b, 18b, 24b, and 26b of the bags 14, 18, 24, and 26, and in the filter accommodating unit 34 in which the filter 35 is arranged. In the upper mold 104 of the present embodiment, the cavities 104b in the shape of the meandering sections 20A and 22A are provided at portions corresponding to the flow paths 20 and 22.

As shown in the cross-sectional view of FIG. 6A, a pressing member 104a that presses the first sheet body 58 and the second sheet body 60 is formed to protrude on both side parts of the cavities 104b of the meandering section 22A. In addition, in the meandering section 22A, wedge-shaped protrusions 104c that protrude toward the lower mold 102 are provided in the pressing member 104a between the adjacent cavities 104b. Further, protrusions 102c, which protrude toward the protrusions 104c at portions facing toward the protrusions 104c, are provided in the lower mold 102. Thin-walled cuttable portions 21 at the fusion-bonded portion (sealed portion 22a) between the first sheet body 58 and the second sheet body 60 are formed by such protrusions 102c and 104c. The lower mold 102 may also be formed in a flat shape without having the protrusions 102c formed thereon. In this case, the protrusions 104c of the one side form the cuttable portions 21.

Further, the lower mold 102 is configured to comprise a flat pressing member 102a. Moreover, in the lower mold 102, cavities may be formed therein at portions corresponding to the cavities 104b of the upper mold 104. The first sheet body 58 and the second sheet body 60 are pressed from upper and lower directions by the pressing member 102a of the lower mold 102 and the pressing member 104a of the upper mold 104. The pressing members 102a and 104a are provided at portions indicated by the oblique lines shown in FIG. 5. Moreover, in the lower mold 102 and the upper mold 104, at portions corresponding to the ports 30, 36a, and 36b and the breakable members 32A to 32C, concave portions 102d and 104d are respectively provided having shapes corresponding to the outer peripheral shapes of the components, and are configured in a manner so as not to cause damage to such components.

As shown in FIG. 5, in the other end of the first bag formation planned portion 61, the second bag formation planned portion 62, the child bag formation planned portion 64, and the third bag formation planned portion 65, nozzles 72 are arranged which supply compressed air between the first sheet body 58 and the second sheet body 60. The nozzles 72 extend into portions of the cavities 102b and 104b of the lower mold 102 and the upper mold 104.

Thereafter, compressed air is supplied through the nozzles 72 between the first sheet body 58 and the second sheet body 60. As shown in FIG. 5, the compressed air introduced from the nozzles 72 presses apart and separates the first sheet body 58 and the second sheet body 60 inside the cavities 104b. The compressed air introduced into the second bag formation planned portion 62 is also introduced into portions corresponding to the outlet-side flow path 22, the filter accommodating unit 34, and the inlet-side flow path 20, whereby the first sheet body 58 and the second sheet body 60 of these portions are pressed apart and separated. Further, the compressed air introduced into the child bag formation planned portion 64 presses apart and separates the first sheet body 58 and the second sheet body 60 at portions corresponding to the transfer line 28.

Thereafter, while compressed air is supplied between the first sheet body 58 and the second sheet body 60, as shown in FIG. 6A, the high frequency power supply 100 applies the high frequency electric field through the lower mold 102 and the upper mold 104, to the pressed portions of the first sheet body 58 and the second sheet body 60. Consequently, the first sheet body 58 and the second sheet body 60 are heated at the portions pressed by the pressing members 102a and 104a, and both of the bodies are fusion bonded. Due to the fusion bonding step, predetermined positions of the first sheet body 58 and the second sheet body 60 are fusion bonded by the sealed portions, and the blood collection bag 14, the inlet-side flow path 20, the filter accommodating unit 34, the outlet-side flow path 22, the parent bag 18, the child bag 24, the medicinal solution bag 26, and the transfer line 28 are integrally formed. Further, the meandering sections 20A and 22A are formed in the flow paths 20 and 22, respectively. As shown in FIG. 6B, in the meandering section 22A, the cuttable portions 21, which are thin-walled grooves, are formed between adjacently disposed portions of the flow path 22. Similar cuttable portions 21 are also formed in the meandering section 20B. Components such as the ports 30, 36a and 36b, the breakable members 32A to 32C, and the tubes 38 and 40 are also fusion bonded to the first sheet body 58 and the second sheet body 60 at the same time. Thereafter, the nozzles 72 are pulled out from between the first sheet body 58 and the second sheet body 60, and the peripheral edges of the first sheet body 58 and the second sheet body 60 at the portions where the nozzles 72 were arranged are fusion bonded, thereby completing the fusion bonding step. After completion of the fusion bonding step, the first sheet body 58 and the second sheet body 60 are removed from the lower mold 102 and the upper mold 104.

Figure 7:
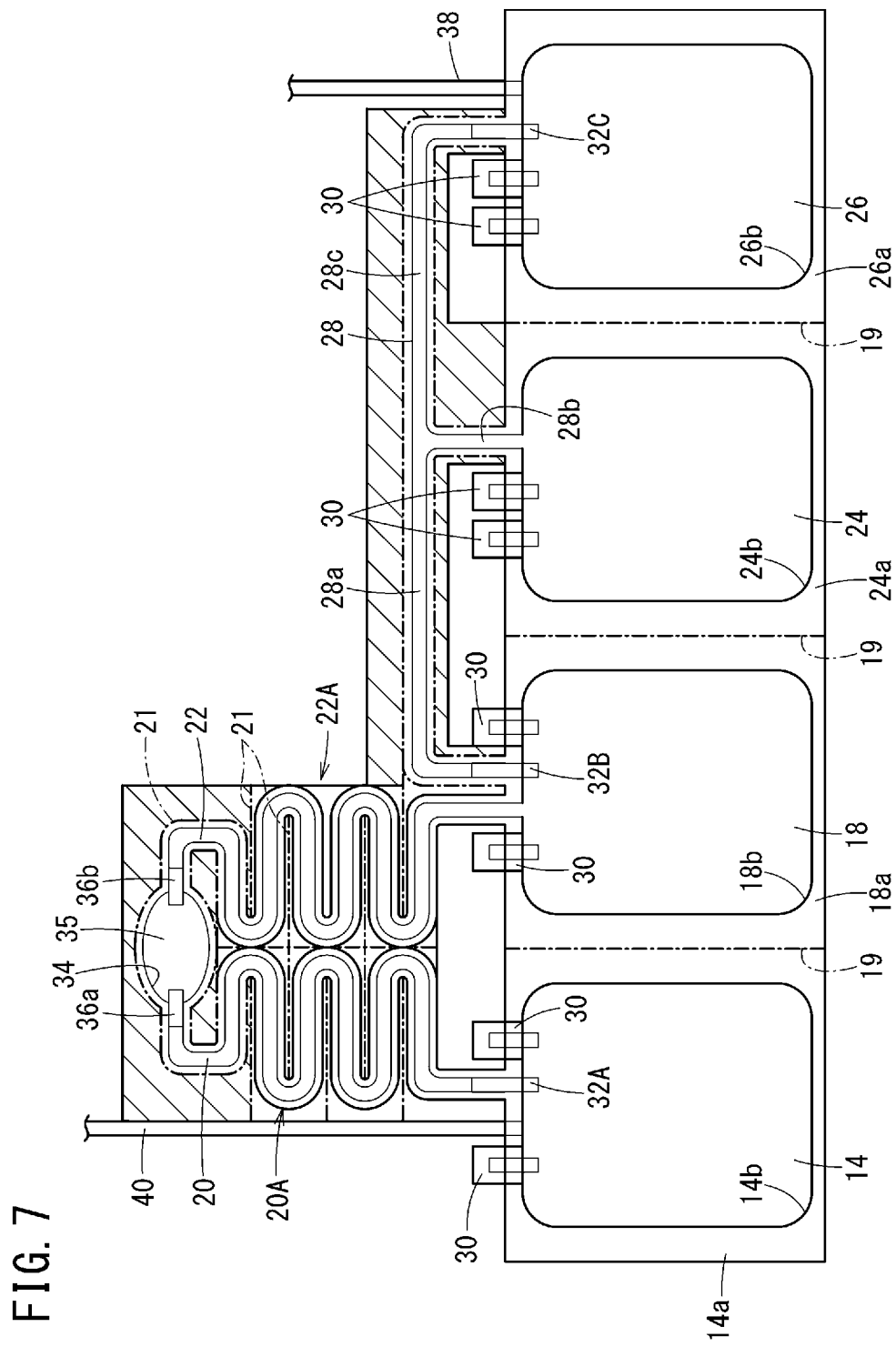
FIG. 7 is a plan view showing a cutting step of cutting the first sheet body and the second sheet body shown in FIG. 5.

Next, as shown in FIG. 7, a cutting step is performed to cut away superfluous sealed portions of the first sheet body 58 and the second sheet body 60. In this instance, the cuttable portions 21 are formed by the wedge-shaped protrusions 104c at portions shown by the one-dot dashed lines in the figure, and the seal portions can be easily cut and separated along the cuttable portions 21. In the example shown in FIG. 7, the cutting process is completed by removing the portions (shaded areas) indicated by the oblique lines. Cutting of the sealed portions may be performed, for example, using a mold having a cutting blade of a predetermined shape. Further, in the cutting step, boundaries between the blood collection bag 14, the parent bag 18, the child bag 24, and the medicinal solution bag 26 are cut and separated at the cutting portions 19. Moreover, instead of completely cutting the boundaries between the blood collection bag 14, the parent bag 18, the child bag 24, and the medicinal solution bag 26, a configuration may be provided in which the cuttable portions 21 are left intact, and are cut and separated immediately prior to use.

Figure 8:
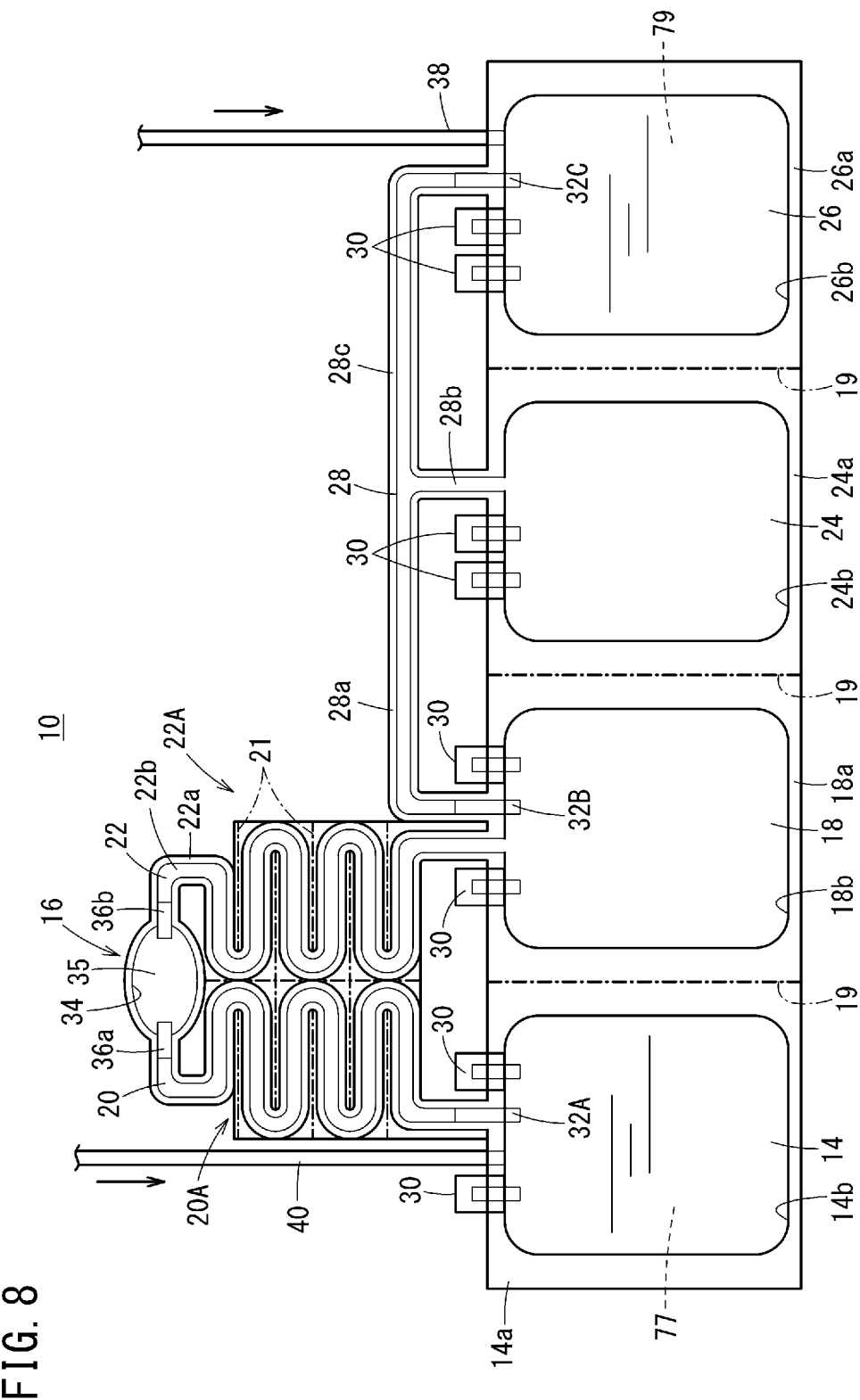
FIG. 8 is an explanatory diagram showing a step of injecting medicinal solutions into a blood collection bag and a medicinal solution bag shown in FIG. 7.

Thereafter, as shown in FIG. 8, predetermined medicinal solutions are injected into the blood collection bag 14 and the medicinal solution bag 26. The anticoagulant 77 for the blood collection bag 14 is injected into the interior 14b of the blood collection bag 14 via the blood collection tube 40. Further, the red blood cell storage solution 79 for the medicinal solution bag 26 is injected into the interior 26b of the medicinal solution bag 26 via the tube 38.

As shown in FIG. 1, after injection of the medicinal solutions is completed, the breakable member 42 and the blood collection unit 12 are attached to the blood collection tube 40. Further, the tube 38 is cut and fusion bonded by a sealer or the like, and is sealed by the sealing member 38a.

By way of the steps described above, manufacturing of the blood bag system 10 is completed. Next, a description will be given in outline concerning a method of using the blood bag system 10.

In the blood bag system 10, blood (whole blood) is accommodated in the blood collection bag 14 through the blood collection unit 12. Thereafter, the user cuts and seals the blood collection tube 40 with a sealer, and separates the blood collection unit 12.

Figure 9:
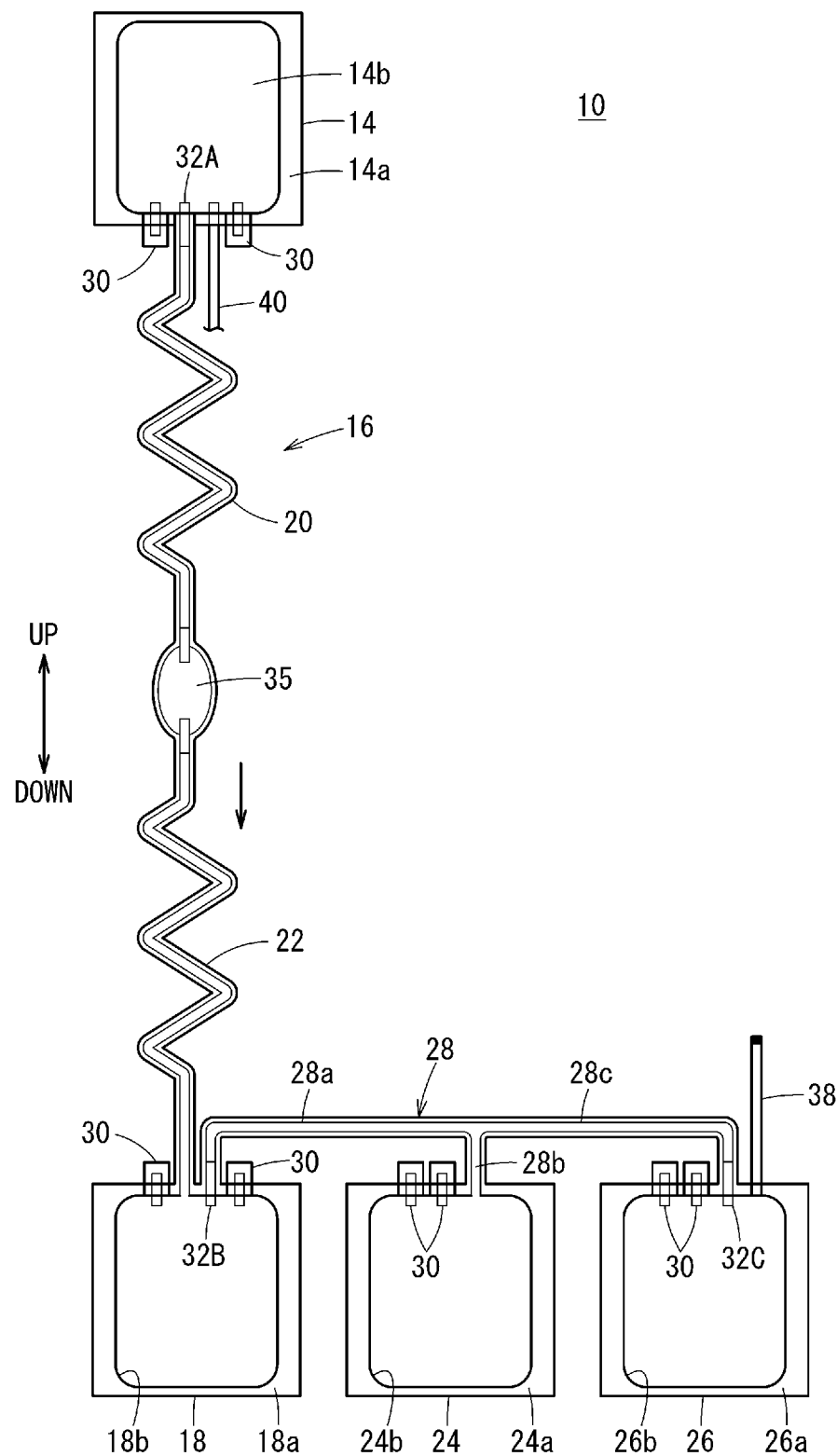
FIG. 9 is an explanatory diagram showing a method of using the blood bag system shown in FIG. 1.

Next, a breaking operation is carried out on the breakable member 32A to thereby transfer the blood components of the blood collection bag 14 into the parent bag 18. As shown in FIG. 9, the cuttable portions 21 provided in the meandering sections 20A and 22A of the flow paths 20 and 22 are cut and separated, and then the flow paths 20 and 22, which are in a folded state, are pulled and extended. At this time, the cuttable portions 21 are separated by pulling the flow paths 20 and 22, and the flow paths 20 and 22 are deformed from the meandering shape into a linearly extended shape. In addition, the blood collection bag 14 is arranged on the upper side, and the parent bag 18, which is the transfer destination for the blood, is arranged on the lower side. Since the flow paths 20 and 22 are placed in a linear shape, a large difference in elevation can be generated between the blood collection bag 14 and the parent bag 18. Consequently, due to the difference in elevation between the blood collection bag 14 and the parent bag 18, the whole blood from the blood collection bag 14 is transferred into the parent bag 18 while passing through the filter 35. At this time, leukocytes and blood platelets are removed by the filter 35 from the blood that is transferred from the blood collection bag 14. Thereafter, by cutting and fusion bonding the flow path 22 with a sealer, the user separates the blood collection bag 14 and the filter 35 (the preprocessing unit 16) from the separation processing unit 17.

Thereafter, the separation processing unit 17 is set in a centrifugal separation device. In the centrifugal separation device, a centrifugal force is applied to the parent bag 18 to thereby separate the blood inside the parent bag 18 into a supernatant component of blood plasma and a sedimentation component of concentrated red blood cells, together with transferring the supernatant component of the blood platelets through the transfer line 28 into the child bag 24. The centrifugal separation device automatically transfers the supernatant component through the transfer line 28. Thereafter, the flow path 28b on the side of the child bag 24 is closed with a clamp, and the red blood cell storage solution 79 is transferred through the transfer line 28 into the parent bag 18, whereupon the centrifugation process of the blood components is completed.

The blood bag system 10 and the method of manufacturing the same according to the present embodiment exhibit the following advantageous effects.

The blood bag system 10 according to the present embodiment is equipped with the plurality of bags in which blood is accommodated, and the flow paths that connect the plurality of bags. In addition, the blood bag system 10 includes the main body portion, which is integrally formed by the first sheet body 58, and the second sheet body 60 that is superimposed on the first sheet body 58. The main body portion includes the first bag (blood collection bag 14) in which the blood is accommodated, the second bag (parent bag 18) in which a blood component contained in the blood is accommodated, the first flow paths (flow paths 20 and 22) connecting the first bag (blood collection bag 14) and the second bag (parent bag 18), and the meandering sections 20A and 22A in which portions of the first flow paths (flow paths 20 and 22) are repeatedly folded back on themselves, and adjacent portions of the first flow paths (flow paths 20 and 22) are fusion bonded to each other, wherein the fusion bonded portions of the first flow paths (flow paths 20 and 22) of the meandering sections 20A and 22A are connected via the thin-walled cuttable portions 21 that are capable of being separated. In this manner, since the flow paths 20 and 22 can be formed in a folded state by the meandering sections 20A and 22A, the elongate flow paths 20 and 22 can be formed using the first sheet body 58 and the second sheet body 60 which are configured in a compact manner. Consequently, the device configuration used for manufacturing the blood bag system 10 can be reduced in size.

The above-described blood bag system 10 may further include the filter accommodating unit 34 which is disposed in the first flow paths (flow paths 20 and 22), and in which there is accommodated the filter 35 configured to remove the predetermined component from the blood. In this case, the meandering sections 20A and 22A may be disposed in at least one of before or after the filter accommodating unit 34. Consequently, by extending the meandering sections 20A and 22A, a sufficient difference in elevation can be generated between the blood collection bag 14 and the parent bag 18, and the blood can be reliably transferred from the blood collection bag 14 into the parent bag 18.

In the above-described blood bag system 10, the cuttable portions 21 are separated by pulling the flow paths 20 and 22, and the flow paths 20 and 22 are deformed from the meandering shape into a linearly extended shape. In accordance with this feature, a sufficient difference in elevation can be generated between the blood collection bag 14 and the parent bag 18.

In the method of manufacturing the blood bag system 10 according to the present embodiment, the blood bag system 10 is equipped with the first bag (blood collection bag 14) in which blood is accommodated, the second bag (parent bag 18) in which blood components separated from the blood are accommodated, and the first flow paths (flow paths 20 and 22) connecting the first bag (blood collection bag 14) and the second bag (parent bag 18), wherein the first bag (blood collection bag 14), the second bag (parent bag 18), and the first flow paths (flow paths 20 and 22) are integrally formed by the first sheet body 58, and the second sheet body 60 that is superimposed on the first sheet body 58, and the first flow paths (flow paths 20 and 22) include the meandering sections 20A and 22A that are repeatedly folded back on themselves. The method of manufacturing the blood bag system includes the step of preparing the first sheet body 58 in which the first bag formation planned portion 51, the second bag formation planned portion 52, and the preprocessing unit formation planned portion 53 are integrally connected, and the second sheet body 60 in which the first bag formation planned portion 61, the second bag formation planned portion 62, and the preprocessing unit formation planned portion 63 are integrally connected, the superimposing step of superimposing the second sheet body 60 on the first sheet body 58, and the fusion bonding step of fusion bonding the first sheet body 58 and the second sheet body 60 at peripheral edge portions of the first bag formation planned portions 51 and 61, the second bag formation planned portions 52 and 62, and the preprocessing unit formation planned portions 53 and 63 while blowing air between the first sheet body 58 and the second sheet body 60, to thereby form the first bag (blood collection bag 14), the second bag (parent bag 18), and the first flow paths (flow paths 20 and 22) respectively in the first bag formation planned portions 51 and 61, the second bag formation planned portions 52 and 62, and the preprocessing unit formation planned portions 53 and 63, wherein, in the fusion bonding step, the meandering sections 20A and 22A of the first flow paths (flow paths 20 and 22) that are repeatedly folded back on themselves are formed in the preprocessing unit formation planned portions 53 and 63.

In accordance with the above-described configuration, even though the flow paths 20 and 22 become elongated, since they can be formed in a folded state, the first sheet body 58 and the second sheet body 60 may be kept small in size.

In the above-described method of manufacturing the blood bag system 10, in the fusion bonding step, while the upper mold 104 (mold) having the meandering cavities 104b is placed in contact with the first sheet body and the second sheet body, and the first sheet body and the second sheet body are separated from one another inside the cavities 104b by air, the meandering sections 20A and 22A may be formed by fusion bonding portions adjacent to the cavities 104b. By blowing air into the cavities 104b in such a manner, the complex meandering flow paths 20 and 22 can be reliably formed.

In the above-described method of manufacturing the blood bag system 10, the upper mold 104 (mold) includes the wedge-shaped protrusions 104c at portions corresponding to the areas between adjacent portions of the flow paths 20 and 22 of the meandering sections 20A and 22A, and by performing fusion bonding while pressing the protrusions 104c against the first sheet body 58 and the second sheet body 60, the thin-walled cuttable portions 21 which are capable of being separated can be formed between the adjacent portions of the flow paths 20 and 22 of the meandering sections 20A and 22A. In accordance with such a configuration, the cuttable portions 21 can be formed at the same time as the fusion bonding, and the manufacturing process can be simplified.

In the above-described method of manufacturing the blood bag system 10, the first sheet body 58 and the second sheet body 60 may further include the filter arrangement planned portion 67 in which the filter 35 configured to remove predetermined cells is provided, and the meandering sections 20A and 22A of the flow paths 20 and 22 may be formed in at least one of between the blood collection bag 14 and the filter accommodating unit 34 and between the filter accommodating unit 34 and the parent bag 18. In accordance with such features, the elongate flow paths 20 and 22 can be provided between the blood collection bag 14 and the parent bag 18, and it is possible to manufacture the blood bag system 10 that brings about the large difference in elevation between the blood collection bag 14 and the parent bag 18.

Although a preferred embodiment of the present invention has been described above, the present invention is not limited to the above-described embodiment. It goes without saying that various modifications can be adopted therein without departing from the scope of the invention. More specifically, in the above-described embodiment, an example has been described in which the meandering sections 20A and 22A are provided in the flow paths 20 and 22; however, meandering sections may also be provided in the flow paths 28a, 28b, and 28c or the like of the transfer line 28.

What is claimed is:

1. A blood bag system equipped with a plurality of bags, and flow paths connecting the plurality of bags, the blood bag system comprising:
    a main body portion integrally formed by a first sheet body, and a second sheet body that is superimposed on the first sheet body;
    wherein the main body portion comprises:
        a bag section comprising:
            a first bag configured to accommodate blood; and
            a second bag configured to accommodate a blood component contained in the blood; and
        a first flow path connecting the first bag and the second bag, the first flow path comprising:
            a first meandering section in which first portions of the first flow path are repeatedly folded back on themselves; and
            a second meandering section adjacent to the first meandering section in which second portions of the first flow path are repeatedly folded back on themselves,
        wherein adjacent first portions and adjacent second portions are connected via a plurality of thin-walled cuttable portions that are cuttable along a first direction to separate each adjacent first portion and each adjacent second portion,
        wherein the first meandering section is connected to the first bag at a first edge of the first bag, and the second meandering section is connected to the second bag at a first edge of the second bag,
        wherein of the first bag and the second bag are connected to one another at respective second edges configured to be separatable,
        wherein, when the first bag and the second bag are connected, the first edge of the first bag, the first edge of the second bag, the first meandering section, and the second meandering section are located at a first side of the bag section, and
        wherein the first meandering section and the second meandering section are connected by an additional thin-walled cuttable portion that is cuttable along a second direction perpendicular to the first direction to separate the first meandering section from the second meandering section.

2. The blood bag system according to claim 1, further comprising a filter section disposed in the first flow path, and configured to accommodate a filter configured to remove a predetermined component from the blood;
    wherein the filter section is disposed in the first flow path between the first meandering section and the second meandering section.

3. The blood bag system according to claim 2, wherein the second direction along which the additional thin-walled cuttable portion-extends intersects with the filter section before the first meandering section is separated from the second meandering section.

4. The blood bag system according to claim 1, wherein the thin-walled cuttable portions and the additional thin-walled cuttable portion enable the first flow path to be transformed into a linearly extended shape.

5. The blood bag system according to claim 1, wherein the first edge of the second bag comprises:
    a first port connected to the second meandering section; and
    one or more additional ports.

6. The blood bag system according to claim 5, wherein the bag section comprises a third bag, and wherein the one or more additional ports of the second bag comprise a port configured to connect to the third bag.

7. The blood bag system according to claim 6, wherein the bag section comprises a fourth bag, and wherein the port configured to connect to the third bag is also configured to connect to the fourth bag.

8. The blood bag system according to claim 1, wherein the first edge of the first bag comprises:
    a first port connected to the first meandering section; and
    one or more additional ports.

9. The blood bag system according to claim 8, wherein the one or more additional ports of the first bag comprise a port configured to connect to a blood collection tube configured to transport the blood from a donor to the first bag.

10. The blood bag system according to claim 1, wherein the bag section further comprises a plurality of ports at the first side of the bag section.

11. The blood bag system according to claim 10, wherein the plurality of ports comprise a first port of the first bag connected to the first meandering section and a second port of the second bag connected to the second meandering section, and wherein one of the first port or the second port comprises a breakable member that provides a seal in the first flow path until broken.

12. The blood bag system according to claim 11, wherein the plurality of ports comprise one or more additional ports of the first bag and the second bag, and wherein each additional port comprises a respective breakable member.

13. The blood bag system according to claim 1, wherein the bag section further comprises:
    a third bag separatable from the second bag; and
    a fourth bag separatable from the third bag.

14. The blood bag system according to claim 13, wherein each of the third bag and the second bag comprise one or more ports at the first side of the bag section when the first bag, the second bag, the third bag, and the fourth bag are not separated.

15. The blood bag system according to claim 13, wherein the main body portion further comprises:
   a second flow path connecting the second bag, the third bag, and the fourth bag.

16. The blood bag system according to claim 15, wherein the second flow path is at the first side of the bag section when the first bag, the second bag, the third bag, and the fourth bag are not separated.

17. A method of manufacturing a blood bag system, the blood bag system including a main body portion integrally formed by a first sheet body, and a second sheet body that is superimposed on the first sheet body;
   wherein the main body portion comprises:
      a bag section comprising:
         a first bag configured to accommodate blood; and
         a second bag configured to accommodate a blood component contained in the blood; and
      a first flow path connecting the first bag and the second bag, the first flow path comprising:
         a first meandering section in which first portions of the first flow path are repeatedly folded back on themselves; and
         a second meandering section adjacent to the first meandering section in which second portions of the first flow path are repeatedly folded back on themselves,
      wherein adjacent first portions and adjacent second portions are connected via a plurality of thin-walled cuttable portions that are cuttable along a first direction to separate each adjacent first portion and each adjacent second portion,
      wherein the first meandering section is connected to the first bag at a first edge of the first bag, and the second meandering section is connected to the second bag at a first edge of the second bag,
      wherein the first bag and the second bag are connected to one another at respective second edges and configured to be separatable, and
      wherein, when the first bag and the second bag are connected, the first edge of the first bag, the first edge of the second bag, the first meandering section, and the second meandering section are located at a first side of the bag section, and
      wherein the first meandering section and the second meandering section are connected by an additional thin-walled cuttable portion that is cuttable along a second direction perpendicular to the first direction to separate the first meandering section from the second meandering section, the method of manufacturing the blood bag system comprising:
   preparing the first sheet body in which a first bag formation planned portion, a second bag formation planned portion, and a first preprocessing formation planned portion are integrally connected, and the second sheet body in which a third bag formation planned portion, a fourth bag formation planned portion, and a second preprocessing formation planned portion are integrally connected;
   superimposing the second sheet body on the first sheet body; and
   fusion bonding the first sheet body and the second sheet body at peripheral edge portions of the first, second, third, and fourth bag formation planned portions and the first and second preprocessing formation planned portions while blowing air between the first sheet body and the second sheet body, to thereby form the first bag, the second bag, and the first flow path respectively;
   wherein, in the fusion bonding step, the first and second meandering sections of the first flow path are formed in the first and second preprocessing formation planned portions.

18. The method of manufacturing the blood bag system according to claim 17, wherein, in the fusion bonding step, while a mold having a meandering cavity is placed in contact with the first sheet body and the second sheet body, and the first sheet body and the second sheet body are separated from one another inside the cavity by air, the first and second meandering sections are formed by fusion bonding portions adjacent to the cavity.

19. The method of manufacturing the blood bag system according to claim 18, wherein the mold includes wedge-shaped protrusions at portions corresponding to areas between adjacent portions of the first flow path of the first and second meandering sections, and by performing fusion bonding while pressing the protrusions against the first sheet body and the second sheet body, the thin-walled cuttable portions configured to be separatable are formed.

20. The method of manufacturing the blood bag system according to claim 17, wherein:
   the first sheet body and the second sheet body further comprise a filter arrangement planned portion in which a filter configured to remove predetermined cells is provided; and
   the filter arrangement planned portion is between the first meandering section and the second meandering section.

\* \* \* \* \*